June 28, 1955 J. B. BOURNE ET AL Re. 24,027

WINDOW FRAME ASSEMBLY

Original Filed Sept. 30, 1949

INVENTORS
JOSEPH B. BOURNE &
CLIFFORD CROOME

BY Fulwider, Mattingly and Huntley

ATTORNEYS

United States Patent Office

Re. 24,027
Reissued June 28, 1955

24,027

WINDOW FRAME ASSEMBLY

Joseph B. Bourne, El Cajon, and Clifford Croome, San Francisco, Calif.

Original No. 2,696,280, dated December 7, 1954, Serial No. 118,912, September 30, 1949. Application for reissue March 29, 1955, Serial No. 497,827

11 Claims. (Cl. 189—75)

Matter enclosed in heavy brackets [ ] appears in the original patent but forms no part of this reissue specification; matter printed in italics indicates the additions made by reissue.

Our invention relates to a window frame and sash and the objects of our invention are: [First, to] *To* provide a window frame and sash comprising a frame having resilient portions in which the sash may be frictionally engaged and securely held therein against displacement. [Second, to] *To* provide a window frame and sash of this class in which the sash may be snapped into the frame whereby force tending to remove the sash from the frame causes increased tightening of the sash in frame. [Third, to] *To* provide a window frame and sash of this class which is very versatile in fitting the window openings in wall studding whereby ample tolerance is provided for the accommodation of considerable discrepancies. [Fourth, to] *To* provide a window frame and sash of this class which saves considerable time of the builder in installing windows in the walls of a house or the like. [Fifth, to] *To* provide a window frame and sash of this class which is very easy to install and which very efficiently excludes the elements from the interior thereof. [Sixth, to] *To* provide a window frame and sash of this class which promotes the complete finishing of buildings preliminary to the installation of the sash which may be snapped to the frame after all other finishing work has been completed. [Seventh, to] *To* provide a window frame and sash of this class incorporating a frame having a channel portion surrounding the same in which plaster or stucco may be very efficiently interlocked rendering the window weatherproof and preventing the cracking of plaster around the frame, *which frame also includes a circumferential nailing flange forming the rear wall of the channel portion and by which the frame is secured to studding or the like, said frame also including inwardly-extending flanges forming a rectangularly shaped and forwardly-facing abutment; this abutment functions as a rectangularly shaped stop for the rearwardly-facing abutment surrounding and forming a part of a second window frame.* [Eighth, to] *To* provide a window frame and sash of this class which is very simple and economical in construction, efficient in operation and which will not readily deteriorate or get out of order.

Figure 1:
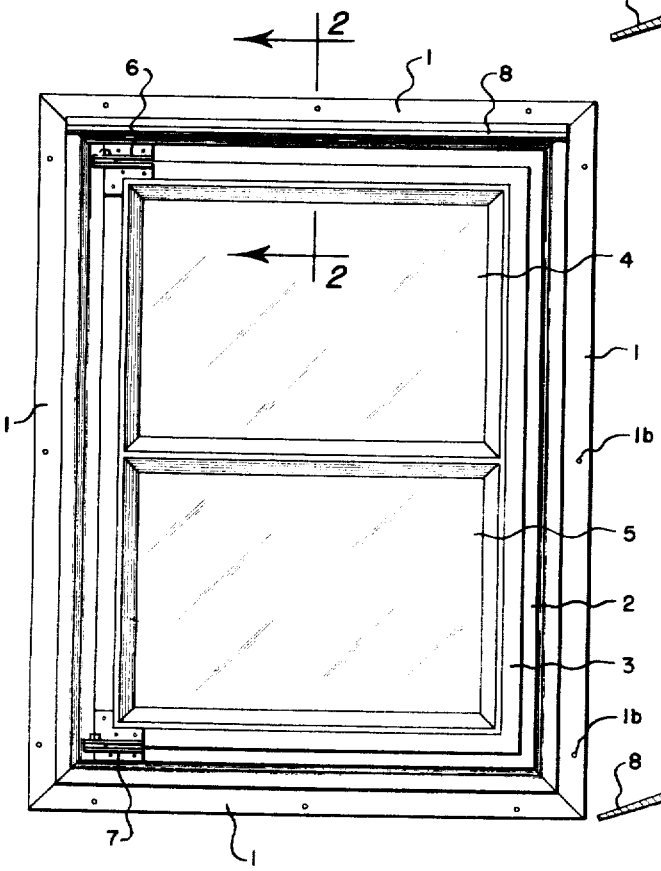
Figure 2:
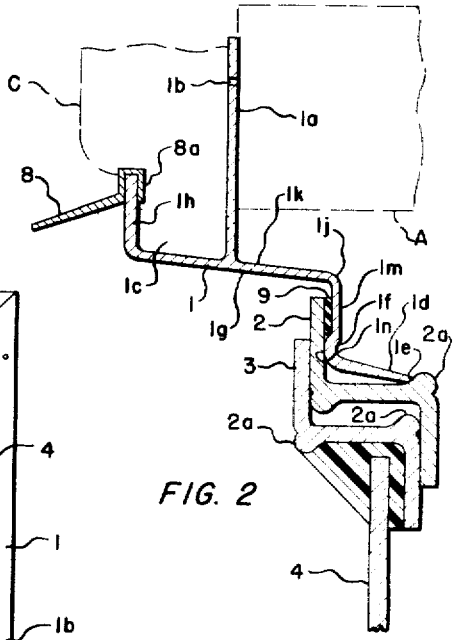
Figure 3:
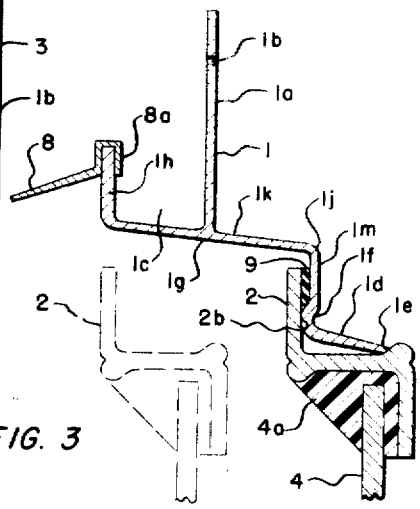

With these and other objects in view, as will appear hereinafter, our invention consists of certain novel features of construction, combination and arrangement of parts and portions as will be hereinafter described in detail and particularly set forth in the appended claims, reference being had to the accompanying drawings and to the characters of reference thereon forming a part of this application in which: Fig. 1 is a side elevational view of our window frame and sash, Fig. 2 is a fragmentary sectional view taken from the line 22 of Fig. 1 showing the same on a large scale and illustrated by dash lines the relative positions of wall studding and plaster and Fig. 3 is a similar view of Fig. 2 illustrating a fixd sash only and showing by dash lines the positions of the sash before interlocking with the frame during the assembly thereof.

Similar characters of reference refer to similar parts and portions throughout the several views of the drawings.

[The frame 1, snap-in frame 2, sash frame 3, window panes 4 and 5, hinges 6 and 7 and the drip cap 8 constitute the principal parts and portions of our window frame and sash. Referring to the accompanying drawings it will be seen that the frame 1 is composed of a plurality of straight sections connected together at miter joints of corners of the frame. The cross-sectional arrangement of the frame 1 as shown in Fig. 2 of the drawings provides an extended nailing flange 1a having openings 1b therein to which nails may be projected into studding as illustrated by dash lines A, Fig. 2 of the drawings. Integral with the nailing flange 1a and forming a part thereof is the channel shaped structure 1c which provides for the interlocking relationship of plaster as illustrated by dash lines C relative to frame 1.]

*Referring to the accompanying drawings, it will be seen that the frame 1 is composed of side sections connected with one another at the top and bottom by top and bottom sections. These sections are connected together at mitered joints at the corners of the rctangularly-shaped frame. The cross sectional arrangement of any one of these sections is shown in Fig. 2 Each of these sections of the rectangularly-shaped frame is provided with an outwardly-extending nailing flange 1a, having openings 1b therein, through which nails may be projected into the studding, as illustrated by dash lines A in Fig. 2 of the drawings. Thus the four sections form an outwardly-extending circumferentially-disposed nailing flange. Each section includes a forwardly-extending flange 1g which merges with an outwardly-extending flange 1h. It will be observed that the flanges 1a and 1h are arranged substantially parallelly of one another. However, flange 1a extends outwardly a greater distance than the flange 1h to provide clearance for hammering nails in position. The flanges 1a, 1g, and 1h provide a circumferential channel 1c in which plaster or stucco established interlocking relationship with the frame 1, as illustrated by dash lines C. Each section of the frame also includes a rearwardly-extending portion 1k which may be said to be a rearward continuation of flange 1g, and the inwardly-extending portion is indicated at 1m. The inwardly-extending portions 1m of the frame sections form a rectangularly-shaped, forwardly-facing abutment 1n.* At the upper horizontal portion of the frame 1, secured to one leg of the channel-shaped in cross-section structure 1c is the drip cap 8 which is a straight angularly-extending member having a clipped portion 8a frictionally engaged with the leg of the channel-shaped portion 1c which extends outermost and in spaced relationship from the flange 1a, it being noted that this drip cap 8 is adapted to shield the frame 1 from water which runs down the outer surface of the plaster c of the window frame 1. [Integral with the nailing flange 1a and the channel-shaped structure 1c is an extending resilient inclined portion 1d having a relatively thin edge 1e which is engageable with a corner bead portion 2a of the snap-in frame 2, or as shown best in Fig. 2 of the drawings.] *Portions 1d extend rearwardly and inwardly from the inner edge of the flange portion 1m. These portions 1d are resilient and are provided with a relatively thin edge 1e at the extreme rear thereof.* It will be noted that the inclined portion 1d is extended around the four sides of the frame 1 so that these inclined portions 1d converge inwardly toward each other and are relieved from each other at the corners of frame 1 so that they may be readily deflected outwardly by the bead portions 2a of the snap-in frame 2 when said snap-in frame 2 is moved from the dash line position as shown in Fig. 3 of the drawings, to the solid line engaged positions wherein the snap-in frame 2 is frictionally engaged in the frame 1 at its bead portions 2a by the edge 1e of the inclined portions 1d. *The rectangular frame 2 is Z-shaped in cross section.*

*This frame includes an outwardly-extending section forming a rectangularly-shaped and rearwardly-facing abutment 2b, which is disposed in confronting relationship with the forwardly-facing abutment 1n of the main frame 1.* Adjacent to the inclined portions 1d is an offset portion 1f which provides for the placement of mastic 9 between the frame 1 and the snap-in frame 2. The sash frame 3, shown in Fig. 2 of the drawings, is formed of a similar extrusion or section to the snap-in frame 2 and as shown in Fig. 1 of the drawings this sash frame 3 is hinged by the means of hinges 6 and 7 to the snap-in frame 2. It will be noted that the sash frames 3 and the snap-in frame 2 are substantially Z-shaped in cross-section and provided with accurate bead portions at their corners. These accurate bead portions 2a serve to strengthen the sections and also provide for the interlocking of the snap-in frame 2 with the edge 1e of the frame 1 as hereinbefore described. It will be noted that 2 planes of the Z-shaped in cross-section frame members 2 and 3 as shown in Fig. 2 of the drawings bear against each other when the sash frame 3 is closed relative to the snap-in frame 2 which provides for an efficient weather seal. As shown in Fig. 3 of the drawings, the glass pane 4 is secured in the snap-in frame 2 by means of putty 4a, while the arrangement, shown in Fig. 2 of the drawing, illustrates the secondary sash frame pivoted to the snap-in frame 2, thus the window pane 4, if desired, may be secured by putty or otherwise into the snap-in frame 2 if it is not desired to provide for ventilation through the particular window.

The operation of our window frame and sash is substantially as follows: The liberal extension of the nailing flange 1a of the frame 1 provides for the adaptation of the frame 1 to openings within the studding A which may vary a considerable amount without being critical to the proper securement of the frame 1 within the wall opening. The nailing flange 1a is secured to the studding as illustrated by dash line A in Fig. 2 of the drawing by positioning a nail in the opening 1b and driving the same into the studding A. It will be noted that several of these openings 1b are provided in the nailing flange portions 1a of the frame 1 for securely connecting said frame 1 to the wall studding A as desired. The channel portion 1c provides an interlock for the plaster as illustrated by dash line C and its extended leg forms an edge over which the clipped portion 8A of the drip cap 8 may be secured as desired. The drip cap 8, when fixed to the leg of the channel portion 1c extends outwardly and downwardly and provides a rain shed for the frame 1, all as shown in Figs. 1 and 2 of the drawings. The portion of the frame 1 extending from the nailing flange inwardly to the edge 1e, as hereinbefore described, is resilient so that the inclined portion 1d may be deflected outwardly when the snap-in frame 2 is forced inwardly from the dash line position to the solid line position as shown in Fig. 3 of the drawing. As the bead portions 2a slide past the inwardly-extending edge portions of the inclined portions 1d which converge toward each other the edge portions 1e move inwardly beyond the bead portions 2a and securely lock the snap-in frame 2 within the outlines of the frame 1 so that pressure exerted on the snap-in frame 2 toward the dash line position, as shown in Fig. 3 of the drawings, causes the inclined portions 1d to be forced inwardly into binding position against the bead portions 2a whereupon the snap-in frame 2 is more securely held in proportion to the force applied which tends to remove it to the dash line position 3; thus the snap-in frame 2 is very securely held in the frame 1 and the mastic 9 in the offset portion 1d of the frame 1 provides for a water-proof seal of the snap-in frame 2 against the frame 1 which excludes the elements from the interior of the frame 1. The double bearing of the sash frame 3 relative to the snap-in frame 2 at the parallel portions of the Z-shaped in cross-section frames 2 and 3 provide for efficient sealing against the elements so that a very efficient window frame and sash is provided employing the structure as shown in Fig. 2 of the drawings. The structure shown in Fig. 3 of the drawings, together with the pane 4 and putty 4a, provides for an equally efficient seal as hereinbefore described in connection with the structural arrangement as disclosed in Fig. 2 of the drawings.

It will be here noted that the sloping portions 1g *and 1k* of the frame *1* serves as a sill for the window which provides for drainages and installation economy.

Though we have shown and described the particular construction, combination and arrangement of parts and portions, we do not wish to be limited to this particular construction, combination and arrangement but desire to include in the scope of our invention the construction, combination and arrangement substantially as set forth in the appended claims.

Having thus described our invention what we claim as new and desire to secure by Letters Patent is:

1. In a window frame, a rectangular frame, adapted to be secured within a building wall window opening and having inwardly converging inclined portions of resilient character having engaging portions at their inner ends and an abutment at their outer portions and a snap-in frame engageable with said inclined portions and having protrusions engageable with the inclined portions at their converging edges whereby the resilient character of said inclined portions causes said converging edges to pass inwardly of said protrusions of said snap-in frame when forced beyond the edges of said inclined portions, said snap-in frame being substantially Z-shaped in cross-section and having said protrusions disposed longitudinally thereof at the external corners thereof, said inclined portions of said frame extending from said protrusions to one of the legs of said Z-shaped in cross-section snap-in frame.

2. In a window frame, a rectangular frame, adapted to be secured within a building wall window opening and having inwardly converging inclined portions of resilient character having engaging portions at their inner ends and an abutment at their outer portions and a snap-in frame engageable with said inclined portions and having protrusions engageable with the inclined portions at their converging edges whereby the resilient character of said inclined portions causes said converging edges to pass inwardly of said protrusions of said snap-in frame when forced beyond the edges of said inclined portions, said snap-in frame being substantially Z-shaped in cross-section and having said protrusions disposed longitudinally thereof at the external corners thereof, said inclined portions of said first frame extending from said protrusions to one of the legs of said Z-shaped in cross-section snap-in frame, said first frame having a nailer flange extending outwardly therefrom.

3. In a window frame, a rectangular frame, adapted to be secured within a building wall window opening and having inwardly converging inclined portions of resilient character having engaging portions at their inner ends and an abutment at their outer portions and a snap-in frame engageable with said inclined portions and having protrusions engageable with the inclined portions at their converging edges whereby the resilient character of said inclined portions causes said converging edges to pass inwardly of said protrusions of said snap-in frame when forced beyond the edges of said inclined portions, said snap-in frame being substantially Z-shaped in cross-section and having said protrusions disposed longitudinally thereof at the external corners thereof, said inclined portions of said first frame extending from said protrusions to one of the legs of said Z-shaped in cross-section snap-in frame, said first frame having a nailer flange extending outwardly therefrom, and plaster interlocking means outwardly of said nailer flange adapted to support plaster at the outer side of said nailer flange.

4. In a window frame, a first rectangular frame adapted to be positioned in a building wall opening, provided with a plurality of inwardly converging inclined portions having engaging portions at their inner ends and an abutment at their outer portions, and a second frame closely conforming with and engageable with said inclined portion and having engaging projections adapted to pass beyond the edges of said inclined portions and interlock therewith, said second mentioned frame having an outwardly directed flange spaced from said engaging projections a distance substantially equal to the distance between the engaging edges of said inclined portions and said abutment portions of said frame, whereby said flange engages said abutment portions when said engaging portions are contacted by said engaging projections.

5. In a window frame, a first rectangular frame to be positioned in a building wall opening, provided with a plurality of inwardly converging inclined portions having engaging portions at their inner ends and an abutment at their outer portions, and a second frame conforming with and engageable with said inclined portions, said second mentioned frame being substantially Z-shaped in cross section and having bead portions for engaging the edges of said inclined portions, the said inclined portions being resilient and adapted to pass inwardly into interference with the beaded portions after the same have been forced beyond the edges of said inclined portions.

6. In a window frame, a first rectangular frame to be positioned in a building wall opening, provided with a plurality of inwardly converging inclined portions having engaging portions at their inner ends and an abutment at their outer portions, and a second frame conforming with and engageable with said inclined portions, said second mentioned frame having an outwardly directed flange spaced from said engaging projections substantially equal to the distance between the engaging edges of said abutment portions of said frame whereby said flange engages said abutment portions when said engaging portions are contacted by said engaging projections, said second mentioned frame being substantialy Z-shaped in cross section and having bead portions for engaging the edges of said inclined portions, the said inclined portions being resilient and adapted to pass inwardly into interference with the beaded portions after the same have been forced beyond the edges of said inclined portions, a mastic seal intermediate said frame and said second frame behind one leg of the Z-shaped in cross-section second mentioned frame.

7. In a window frame, a first rectangular frame to be positioned in a building wall opening, provided with a plurality of inwardly converging inclined portions having engaging portions at their inner ends and an abutment at their outer portions, and a second frame conforming with and engageable with said inclined portions and having engaging projections to pass beyond the edges of said inclined portions and interlock therewith, said second mentioned frame having an outwardly directed flange spaced from said engaging projections substantially equal to the distance between the engaging edges of said abutment portions of said frame whereby said flange engages said abutment portions when said engaging portions are contacted by said engaging projections, said second mentioned frame being substantially Z-shaped in cross section and having bead portions for engaging the edges of said inclined portions, the said inclined portions being resilient and adapted to pass inwardly into interference with the beaded portions after the same have been forced beyond the edges of said inclined portions, a mastic seal intermediate said frame and said second frame behind one leg of the Z-shaped in cross-section second mentioned frame, the outer portion of said first frame having a channel shaped portion, one leg of which forms a nailing flange, to provide for the interlocking of plaster therein, a drip cap clipped to one extending leg of said channel-shaped in cross section portion of said first frame and extending outwardly and downwardly.

8. In a window frame, a first rectangular frame to be positioned in a building wall opening, provided with a plurality of inwardly converging inclined portions having engaging portions at their inner ends and an abutment at their outer portions, and a second frame conforming with and engageable with said inclined portions and having engaging projections to pass beyond the edges of said inclined portions and interlock therewith, said second mentioned frame having an outwardly directed flange spaced from said engaging projections substantially equal to the distance between the engaging edges of said abutment portions of said frame whereby said flange engages said abutment portions when said engaging portions are contacted by said engaging projections, said second mentioned frame being substantially Z-shaped in cross section and having bead portions for engaging the edges of said inclined portions, the said inclined portions being resilient and adapted to pass inwardly into interference with the beaded portions after the same have been forced beyond the edges of said inclined portions, a mastic seal intermediate said frame and said second frame behind one leg of the Z-shaped in cross-section second mentioned frame, the outer portion of said first frame having a channel shaped portion, one leg of which forms a nailing flange, to provide for the interlocking of plaster therein, a drip cap clipped to one extending leg of said channel-shaped in cross-section portion of said first frame and extending outwardly and downwardly, said drip can having a channel-shaped clipped portion engaging said leg of said channel-shaped in cross-section portion.

9. In a window frame, a rectangular frame, adapted to be secured within a building wall window opening and having inwardly converging inclined portions of resilient character, having engaging portions at their inner ends and an abutment at their outer portions, and a second frame engageable with said inclined portions and having protruding portions engageable with the inclined portions at their converging edges whereby the resilient character of said inclined portions causes said converging edges to pass inwardly of said protrusions of said second mentioned frame when forced beyond the edges of said inclined portions, said second mentioned frame being substantially Z-shaped in cross-section and having said protrusions disposed longitudinally thereof at the external corners thereof, said inclined portions of said first frame extending from said protrusions to one of the legs of said Z-shaped in cross-section second mentioned frame.

10. In a window frame, a nailer flange extending outwardly from the said window frame in the manner of a reveal for securement to adjacent window studding structure and having an integral outwardly and upwardly extending plaster retainer flange and having a hook shaped portion engageable with said frame.

*11. A window frame comprising opposite side sections and bottom and top sections, the opposite ends of the bottom and top sections being connected with the ends of the side sections to form an endless rectangularly-shaped frame, each of said sections including: an outwardly-extending nailing flange, a flange extending forwardly of the inner end of the nailing flange, a flange extending outwardly of the forward end of the forwardly-extending flange, said second-mentioned outwardly-extending flange being arranged substantially parallelly with the first-mentioned outwardly-extending flange, said flanges cooperating to form a circumferential channel for receiving plaster or the like, said nailer flanges extending outwardly a greater distance from the forwardly-extending flanges than the second-mentioned outwardly-extending flanges, said sections also each including an inwardly and vertically-extending flange, said latter flanges cooperating to form*

*a rectangularly-shaped and forwardly-facing abutment; and a second window frame having outwardly-extending flanges thereabout forming a rectangularly-shaped and rearwardly-facing abutment, said rearwardly-facing abutment being in confronting relationship with the forwardly-facing abutment of the first-mentioned frame.*

References Cited in the file of this patent or the original patent

UNITED STATES PATENTS

| | | |
|---|---|---|
| 1,433,442 | White | Oct. 24, 1922 |
| 1,660,408 | Bayley | Feb. 28, 1928 |
| 1,897,643 | Reese | Feb. 14, 1933 |
| 1,925,817 | Plym | Sept. 5, 1933 |
| 1,950,401 | Fixter | Mar. 13, 1934 |
| 1,959,643 | Plym | May 22, 1934 |
| 2,044,258 | Reynaud | June 16, 1936 |

FOREIGN PATENTS

| | | |
|---|---|---|
| 376,255 | Great Britain | June 27, 1932 |
| 403,294 | Great Britain | Dec. 21, 1933 |